United States Patent
Warke et al.

(10) Patent No.: US 11,333,760 B2
(45) Date of Patent: May 17, 2022

(54) FREQUENCY MODULATION FOR INTERFERENCE FREE OPTICAL TIME OF FLIGHT SYSTEM

(71) Applicant: TEXAS INSTRUMENTS INCORPORATED, Dallas, TX (US)

(72) Inventors: Nirmal C. Warke, Saratoga, CA (US); David P. Magee, Allen, TX (US); Baher S. Haroun, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1162 days.

(21) Appl. No.: 15/649,493

(22) Filed: Jul. 13, 2017

(65) Prior Publication Data
US 2019/0018138 A1    Jan. 17, 2019

(51) Int. Cl.
*G01S 17/26* (2020.01)
*G01S 7/481* (2006.01)

(52) U.S. Cl.
CPC ............ *G01S 17/26* (2020.01); *G01S 7/4817* (2013.01)

(58) Field of Classification Search
CPC ........ G01S 17/08; G01S 17/26; G01S 7/4817; G01S 7/484
See application file for complete search history.

(56) References Cited

U.S. PATENT DOCUMENTS

| | | | |
|---|---|---|---|
| 7,405,629 B2 * | 7/2008 | Li ................ | H03C 3/0933 327/157 |
| 9,091,155 B2 * | 7/2015 | Barfoot ................ | G01V 5/04 |
| 9,410,903 B2 * | 8/2016 | Duncan ............... | G01N 21/954 |
| 9,575,184 B2 * | 2/2017 | Gilliland .............. | G01S 7/484 |
| 9,831,881 B2 * | 11/2017 | Josefsberg ........... | H03L 7/085 |
| 10,145,671 B2 * | 12/2018 | Khatuntsev .......... | G01C 15/006 |
| 10,408,925 B1 * | 9/2019 | Manzur ................ | G01S 17/10 |
| 10,416,292 B2 * | 9/2019 | de Mersseman ..... | G01S 7/484 |
| 10,473,784 B2 * | 11/2019 | Puglia ................. | G01S 17/931 |
| 2013/0120565 A1 * | 5/2013 | Wilks .................. | H04N 5/2256 348/135 |
| 2016/0003946 A1 | 1/2016 | Gilliland et al. | |
| 2019/0317193 A9 | 10/2019 | O'Keeffe | |

FOREIGN PATENT DOCUMENTS

DE    102015114328 A1 *  3/2016  .......... G01S 13/345

* cited by examiner

*Primary Examiner* — Hovhannes Baghdasaryan
(74) *Attorney, Agent, or Firm* — Ray A. King; Charles A. Brill; Frank D. Cimino

(57) ABSTRACT

An optical time of flight system includes a transmitter and a receiver. The transmitter is configured to generate a modulation signal having a modulation signal frequency that varies as a function of time, generate an optical waveform with amplitude modulation corresponding to the modulation signal, and direct the optical waveform toward a field of view (FOV). The receiver is configured to receive the optical waveform reflected off of an object within the FOV and determine a distance to the object based on a time of flight from the transmitter to the object and back to the receiver.

19 Claims, 6 Drawing Sheets

FREQUENCY MODULATION FOR INTERFERENCE FREE OPTICAL TIME OF FLIGHT SYSTEM

BACKGROUND

Optical time of flight systems generally use optical light signals to measure distances to objects based on the time of flight of the light signal to the object and back to the system. For example, Light Detection and Ranging (LiDAR, LIDAR, lidar, LADAR) is an optical time of flight system that measures the distance to one or more objects by reflecting a laser light (a single narrow pulse, sequence of modulated narrow pulses, and/or a continuous wave) off of the one or more objects and analyzing the reflected light. More specifically, LiDAR systems typically determine a time of flight (TOF) for the laser pulse to travel from the laser to an object and return back to the system by analyzing the correlation or the phase shift between the reflected light signal and the transmitted light signal. The distance to the object may then be determined based on the TOF. These systems may be used in many applications including: geography, geology, geomorphology, seismology, transport, and remote sensing. For example, in transportation, automobiles may include LiDAR systems to monitor the distance between the vehicle and other objects (e.g., another vehicle). The vehicle may utilize the distance determined by the LiDAR system to, for example, determine whether the other object, such as another vehicle, is too close, and automatically apply braking.

SUMMARY

In accordance with at least one embodiment of the disclosure, an optical time of flight system includes a transmitter and a receiver. The transmitter is configured to generate a modulation signal having a modulation signal frequency that varies as a function of time, generate an optical waveform with amplitude modulation corresponding to the modulation signal, and direct the optical waveform toward a field of view (FOV). The receiver is configured to receive the optical waveform reflected off of the object and determine a distance to the object based on a time of flight from the transmitter to the object and back to the receiver.

Another illustrative embodiment is an optical transmitting system for optical distance measuring that includes a modulation signal generator and a laser diode coupled to the modulation signal generator. The modulation signal generator is configured to generate a modulation signal having a modulation signal frequency that varies as a function of time. The laser diode is configured to generate an optical waveform with amplitude modulation corresponding to the modulation signal.

Yet another illustrative embodiment is a method for determining a distance to an object within a FOV. The method includes generating a modulation signal having a modulation signal frequency that varies as a function of time. The method also includes generating an optical waveform with amplitude modulation corresponding to the modulation signal. The method also includes directing the optical waveform toward an object within the FOV. The method also includes receiving the optical waveform reflected off of the object. The method also includes determining a distance to the object based on a time of flight of the optical waveform.

BRIEF DESCRIPTION OF THE DRAWINGS

For a detailed description of various examples, reference will now be made to the accompanying drawings in which.

NOTATION AND NOMENCLATURE

Figure 1:
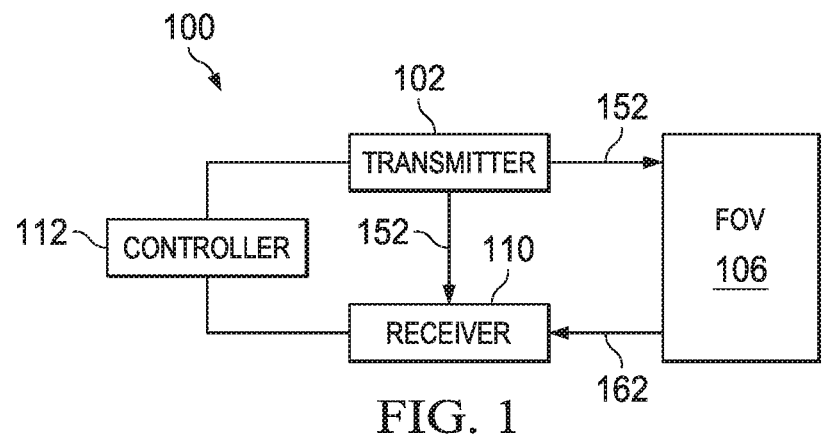
FIG. 1 shows an illustrative optical time of flight system in accordance with various examples.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Optical time of flight systems, such as LiDAR systems (point LiDAR and scanning LiDAR) and three dimensional (3D) TOF cameras, determine distances to various objects utilizing the TOF of an optical signal (e.g., a light signal) to the object and its reflection off the object back to the TOF system (return signal). These systems can be used in many applications including: geography, geology, geomorphology, seismology, transport, and remote sensing. For example, in transportation, automobiles can include LiDAR systems to monitor the distance between the vehicle and other objects (e.g., another vehicle). The vehicle can utilize the distance determined by the LiDAR system to, for example, determine whether the other object, such as another vehicle, is too close, and automatically apply braking.

Some LiDAR systems scan their field of view (FOV) (e.g., using a rotating optical system or other beam steering method) to determine distance information for objects in its FOV. The intensity of the reflected light is measured for several vertical planes through a full 360 degree rotation. For example, these LiDAR systems can use a rotating set of transmit and receive optics. For each scan plane, a light beam is transmitted and received at each angular position of the rotating system (e.g., a light beam is transmitted to a number of scan points in a grid pattern in the FOV and reflected off objects located at the scan points). When complete, a 3D image of the FOV can be generated.

In many applications, multiple optical TOF systems operate in the same environment which can cause interference between the systems resulting in erroneous distance measurements. Therefore, there is a need to develop an optical TOF system that reliably distinguishes between signals transmitted by the system from signals transmitted by other systems. In accordance with various examples, an optical TOF system is provided in which the amplitude of the transmitted optical waveform is modulated with a low frequency waveform. This waveform has a modulating signal frequency that varies, either continuously or in discrete steps, as opposed to fixed frequency modulating signals found in conventional systems. By varying the frequency of the modulating signal, the amplitude modulation of the transmitted optical waveform will correspondingly vary, hence providing a distinguishing "signature" to optical waveforms transmitted by the system. Thus, the receiver is able to distinguish a return signal intended for the system from signals intended for other systems.

FIG. 1 shows an illustrative optical TOF system 100 in accordance with various examples. The optical TOF system 100 includes a transmitter 102, receiver 110, and controller 112. The transmitter 102 is configured to generate one or more optical waveforms 152 by the controller 112. The controller 112 can be implemented as a processor (e.g., a microcontroller, a general-purpose processor, etc.) that executes instructions retrieved from a storage device, or as dedicated hardware circuitry. In some embodiments, the optical waveform 152 is a single tone (e.g., a continuous wave) with amplitude modulation (e.g., a continuous amplitude modulated waveform).

The transmitter 102 is also configured, in an embodiment, to direct the optical waveform 152 toward the field of view (FOV) 106. In some embodiments, the transmitter 102 directs the optical waveform 152 toward the FOV 106 by directing the optical waveform 152 directly to the FOV 106. In other embodiments, the transmitter 102 directs the optical waveform 152 toward the FOV 106 by directing the optical waveform to a beam steering device (not shown) which then directs the optical waveform 152 to the FOV 106. In such embodiments, the beam steering device receives the optical waveform 152 from the transmitter 102 and steers the optical waveform 152 to the FOV 106. Thus, the transmitter 102 can direct the optical waveform 152 directly to the FOV 106 or can direct the optical waveforms 152 to a beam steering device which directs the optical waveform 152 to the FOV 106. In addition to directing the optical waveform 152 toward the FOV 106, in some embodiments, multiple optical waveforms 152 are directed to scan the FOV 106. More, particularly, the transmitter 102 and/or the beam steering device directs/steers the optical waveforms 152 to a plurality of scan points within the FOV 106. For example, the transmitter 102 and/or the beam steering device (which, in some embodiments, is a solid state device with controllable micromirrors or a phased array, a motorized platform attached to a laser, a rotatable mirror, and/or any other device for beam steering) is configured to direct/steer one optical waveform to a first scan point in the FOV 106 and direct/steer a second optical waveform to a second scan point in the FOV 106. In this way, a scan of one or more scan regions, each containing a number of scan points within the FOV, is performed.

The optical waveform 152 reflects off of an object within the FOV 106 and returns toward the receiver 110 as reflected optical waveform 162. The reflected optical waveform 162 is then received by the receiver 110. In some embodiments, an additional beam steering device (not shown) steers the reflected optical waveform 162 to the receiver 110. In some embodiments, the receiver 110 receives the reflected optical waveform 162 directly from an object within the FOV 106.

The receiver 110 is configured to receive the reflected optical waveform 162 and determine the distance to an object within the FOV 106 based on the TOF from the transmitter 102 to the object and back to the receiver 110. For example, the speed of light is known, so the distance to the object is determined and/or estimated using the TOF. That is, the distance is estimated as $$d = \frac{c * TOF}{2}$$

where d is the distance to the object, c is the speed of light, and TOF is the time of flight. The speed of light times the TOF is halved to account for the travel of the light pulse to, and from, the object within the FOV 106. In some embodiments, the receiver 110, in addition to receiving the reflected optical waveform 162 reflected off an object within the FOV 106, is also configured to receive the optical waveform 152, or a portion of the optical waveform 152, directly from the transmitter 102. The receiver 110, in an embodiment, is configured to convert the two optical signals into electrical signals, a received signal corresponding to the reflected optical waveform 162 and a reference signal corresponding to the optical waveform 152 received directly from the transmitter 102. The receiver 110 then, in an embodiment, performs a correlation function using the reference signal and the received signal. A peak in the correlation function corresponds to the time delay of the received reflected optical waveform 162 (i.e., the TOF). The distance can then be estimated using the formula discussed above. In other embodiments, a fast Fourier transform (FFT) can be performed on the received signal. A phase of the tone is then used to estimate the delay (i.e., TOF) in the received signal. The distance can then be estimated using the formula discussed above. In yet other embodiments, the in-phase (I)

component is determined by correlating the received reflected optical waveform 162 with the transmitted optical waveform 152 received directly from the transmitter 102, and the quadrature (Q) component is determined by correlating the received reflected optical waveform 162 with a 90 degree phase shifted version of the transmitted optical waveform 152 received directly from the transmitter 102. The integrated charges for the I/Q signals are used to estimate the phase shift between the optical waveform 152 received directly from the transmitter 102 and the received reflected optical waveform 162. The distance can then be estimated using the formula discussed above.

Figure 2:
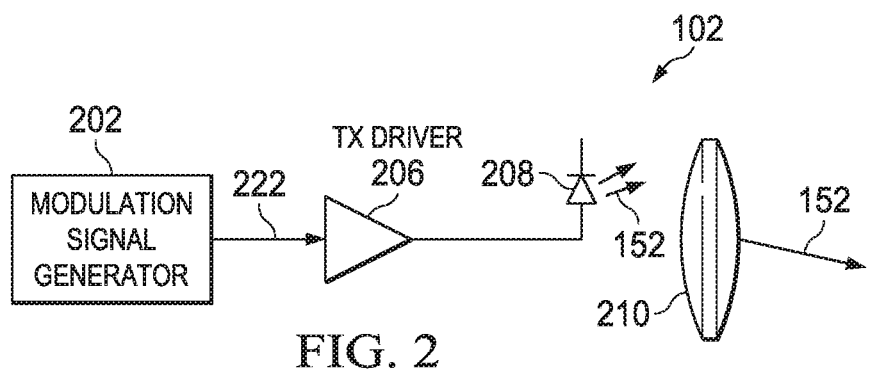
FIG. 2 shows an illustrative transmitter for an optical time of flight system in accordance with various examples.

FIG. 2 shows an illustrative transmitter 102 for optical TOF system 100 in accordance with various examples. The transmitter 102, in an embodiment, includes a modulation signal generator 202, a transmit driver 206, a laser diode 208, and an optics device 210. The modulation signal generator 202 is configured to provide a modulation reference signal, shown as modulation signal 222. For example, in some embodiments, the modulation signal generator 202 is configured to generate a single tone (i.e. continuous wave) modulation signal 222 at a frequency that varies as a function of time. The bandwidth of the modulation signal 222 (i.e., the modulation signal bandwidth) is, in an embodiment, less than (e.g., a small fraction of) the mean frequency of the modulation signal 222. For example, assuming that the modulation signal 222 varies between 9.5 MHz and 10.5 MHz, the bandwidth of the modulation signal 222 is 1 MHz while the mean frequency of the modulation signal 222 is 10 MHz. In this example, the bandwidth of the modulation signal 222 is $\frac{1}{10}$ the mean frequency of the modulation signal 222.

The transmit driver 206 generates a drive signal (regulates the current) to control an optical transmitter such as laser diode 208 based on the modulation signal 222. In other words, the modulation signal 222 modulates the intensity of the light transmitted by laser diode 208 during the pulse. For example, the transmit driver 206, in an embodiment, includes one or more power switches that regulate the current to the laser diode 208. The power switches switch at the frequency of the modulation signal 222. Therefore, by varying the frequency of the modulation signal 222 (and thus, varying the switching frequency of the power switches in the transmit driver 206), the amplitude modulation of the optical waveforms 152 also varies providing a distinguishing characteristic to the optical waveform 152. Thus, in an embodiment, the modulation signal generator 202 is configured to vary the modulation signal 222 as a function of time. In some embodiments, the modulation signal 222 frequency is continuously varied as a function of time. In other embodiments, the modulation signal 222 frequency is varied as a function of time in a plurality of discrete frequency steps. In some embodiments, the optical waveform 152 has a wavelength of 905 nanometers, and thus, a relatively high frequency (e.g., 331 THz). In contrast, the frequency of the modulation signal 222 is, in an embodiment, much less than the frequency of the optical waveform 152. While laser diode 208 is shown in FIG. 2, any type of optical signal generator (e.g., a light emitting diode (LED)) can be utilized to generate the optical waveform 152. The optical device 210, which, in an embodiment is one or more lenses, is configured to direct (e.g., focus) the optical waveform 152 (e.g., the modulated light signal) toward the FOV 106.

Figure 3A:
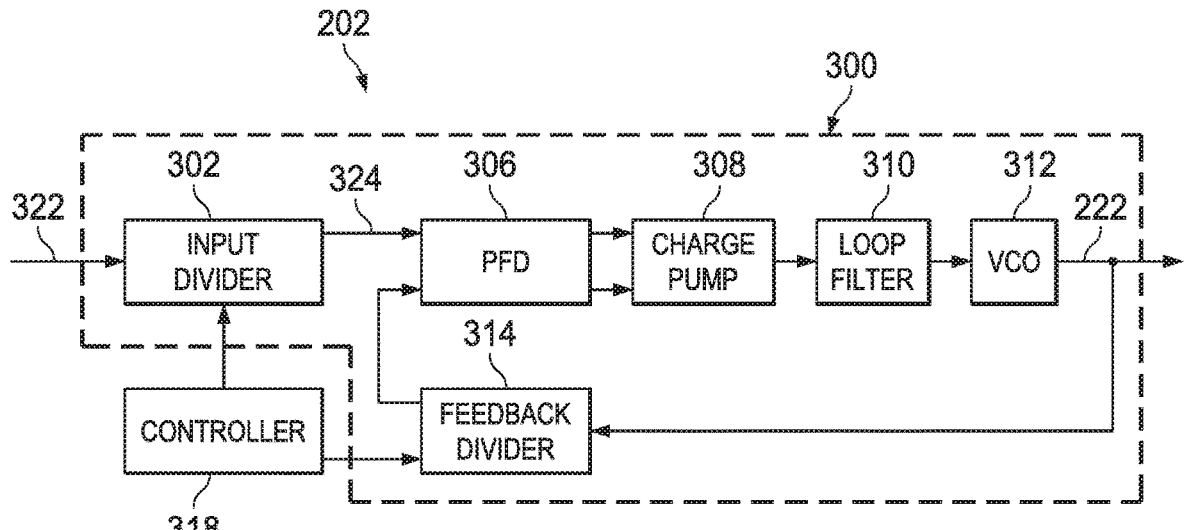
FIG. 3A shows an illustrative modulation signal generator for a transmitter for an optical time of flight system in accordance with various examples.

FIG. 3A shows an illustrative modulation signal generator 202 for transmitter 102 for optical TOF system 100 in accordance with various examples. As shown in FIG. 3A, the modulation signal generator 202 includes, in an embodiment, a phased-lock loop (PLL) 300 that includes an input divider 302, a phase/frequency detector (PFD) 306, a charge pump 308, a loop filter 310, a voltage controlled oscillator (VCO) 312, and a feedback divider 314. The PLL 300 generates an output signal, the modulation signal 222, having a frequency that is a programmable multiple of an input signal 322 frequency (e.g., generated by a crystal oscillator). In some embodiments, the frequency of the input signal 322 is varied. Furthermore, the frequency of the input signal 322 is varied, in some embodiments, continuously, and in other embodiments in discrete steps. Alternatively, the frequency of the input signal 322, in some embodiments, is configured to remain constant. The input signal 322, in an embodiment, is divided by input divider 302 to generate the reference signal 324. The input divider 302 includes, in some embodiments, a dual-modulus divider, binary counters, or other circuitry that allows division of the input signal frequency by a programmable divisor coefficient. In alternative embodiments, the input signal 322 is provided directly, without division to the PFD 306 as the reference signal 324.

VCO 312 is, in an embodiment, an electronic oscillator configured to control oscillation frequency by a voltage input. Thus, the frequency of oscillation created is varied by the applied voltage. Therefore, the VCO 312 generates the modulation signal 222 based on a control voltage provided by the loop filter 310. While shown internal to PLL 300 in FIG. 3A, VCO 312 can be, in an embodiment, external to the remaining components of the PLL 300 (e.g., VCO 312 can be on a separate chip than the other components of PLL 300). Because the frequency of the input signal 322 can vary (e.g., the frequency of the input signal 322 can be different at different times), the VCO 312 can generate a modulation signal 222 that varies as a function of time.

The output frequency of the VCO 312 is reduced by the feedback divider 314 and compared, by the PFD 306, to the reference signal 324. The feedback divider 314 includes, in some embodiments, a dual-modulus divider, binary counters, or other circuitry that allows division of the output signal frequency of the VCO 312 by a programmable divisor coefficient. The PFD 306 identifies differences in the phase and/or frequency of the output of the feedback divider 314 and the reference signal 324 and generates signals that control the charge pump 308 responsive to the identified differences in phase and/or frequency. The charge pump 308 generates currents to charge and discharge one or more capacitors in the loop filter 310. The voltage across each of the capacitors form the control voltage applied to the VCO 312 for a given period of time. For example, if the PFD 306 determines that the reference frequency 324 has a frequency that is greater than the frequency output by the feedback divider 314, the PFD 306 outputs signals that cause the charge pump 308 to drive a current into the loop filter 310, thereby, increasing the voltage across one of the capacitors and increasing the output frequency of the VCO 312, and thus, the modulation signal 222 frequency.

The modulation signal generator 202, in an embodiment, also includes a controller 318 that determines and sets the frequency scaling coefficients applied by the PLL 300. The controller 318 can be implemented as a processor (e.g., a microcontroller, a general-purpose processor, etc.) that executes instructions retrieved from a storage device, or as dedicated hardware circuitry. In some embodiments, the controller 318 is implemented in or is a part of controller 112. The controller 318 can compute the coefficients for the input divider 302 and/or feedback divider 314 based on a selected output frequency, can retrieve pre-computed coefficients from a table, etc. In other words, the division values of the input divider 302 and/or the feedback divider 314 are programmable and/or changeable by the controller 318. Hence, the division values of the input divider 302 and/or the feedback divider 314 can vary as a function of time. This variation in the division values leads to variation in the frequency of the modulation signal 222 as a function of time. However, because the division values of the input divider 302 and the feedback divider 314 are integers, the frequency variation of the modulation signal 222, based on changing these division values only, will be as discrete frequency steps and not continuous variation.

Figure 3B:
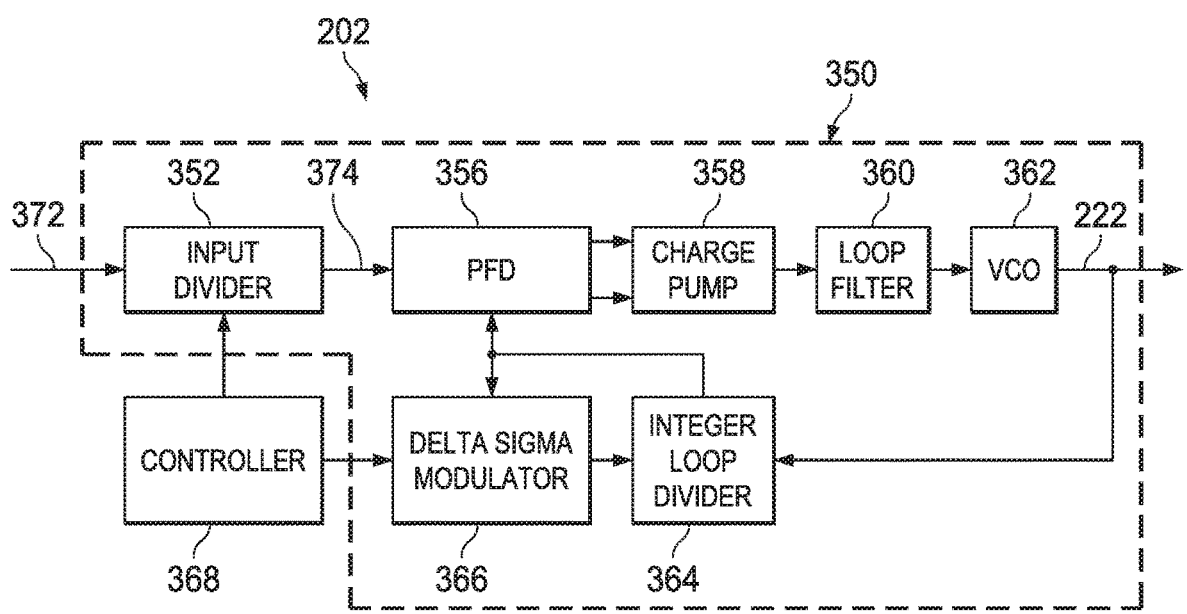
FIG. 3B shows an illustrative modulation signal generator for a transmitter for an optical time of flight system in accordance with various examples.

FIG. 3B shows another illustrative modulation signal generator 202 for transmitter 102 for optical TOF system 100 in accordance with various examples. As shown in FIG. 3B, the modulation signal generator 202 includes, in an embodiment, a fractional frequency synthesizer (FFS) 350 that includes an input divider 352, a PFD 356, a charge pump 358, a loop filter 360, a VCO 362, an integer loop divider 364, and a delta sigma modulator 366. The FFS 350 generates an output signal, the modulation signal 222, having a frequency that is a programmable multiple of an input signal 372 frequency (e.g., generated by a crystal oscillator). In some embodiments, the frequency of the input signal 372 is varied. Furthermore, the frequency of the input signal 372 is varied, in some embodiments, continuously, and in other embodiments in discrete steps. Alternatively, the frequency of the input signal 372, in some embodiments, is configured to remain constant. The input signal 372, in an embodiment, is divided by input divider 352 to generate the reference signal 374. The input divider 352 includes, in some embodiments, a dual-modulus divider, binary counters, or other circuitry that allows division of the input signal frequency by a programmable divisor coefficient. In alternative embodiments, the input signal 372 is provided directly, without division to the PFD 356 as the reference signal 324.

VCO 362 is, in an embodiment, an electronic oscillator configured to control oscillation frequency by a voltage input. Thus, the frequency of oscillation created is varied by the applied voltage. Therefore, the VCO 362 generates the modulation signal 222 based on a control voltage provided by the loop filter 360. While shown internal to FFS 350 in FIG. 3B, VCO 362 can be, in an embodiment, external to the remaining components of the FFS 350 (e.g., VCO 362 can be on a separate chip than the other components of FFS 350). Because the frequency of the input signal 372 can vary (e.g., the frequency of the input signal 372 is different at different times), the VCO 362 can generate a modulation signal 222 that varies as a function of time.

The output frequency of the VCO 362 is reduced by the integer loop divider 364 and compared, by the PFD 356, to the reference signal 374. The integer loop divider 364 includes, in some embodiments, a dual-modulus divider, binary counters, or other circuitry that allows division of the output signal frequency of the VCO 362 by a programmable divisor coefficient. The delta-sigma modulator 366 controls variation in the integer values applied by the integer loop divider 364 to produce the fractional divisor applied to the VCO output signal frequency. For example, if the fractional divisor to be applied to the VCO output signal frequency is 10.5, then the delta-sigma modulator 366 causes the integer loop divider 364 to divide the VCO output signal frequency by 10 half the time and by 11 half the time to produce an average division of 10.5. The delta-sigma modulator 366 randomizes the application timing of the different integer divisor coefficients while maintaining the desired average divisor coefficient. The delta-sigma modulator 366 can be a multi-stage noise shaping (MASH) delta sigma modulator.

The PFD 356 identifies differences in the phase and/or frequency of the output of the integer loop divider 364 and the reference signal 374 and generates signals that control the charge pump 358 responsive to the identified differences in phase and/or frequency. The charge pump 358 generates currents to charge and discharge one or more capacitors in the loop filter 360. The voltage across each of the capacitors form the control voltage applied to the VCO 362 for a given period of time. For example, if the PFD 356 determines that the reference frequency 374 has a frequency that is greater than the frequency output by the integer loop divider 364, the PFD 356 outputs signals that cause the charge pump 358 to drive a current into the loop filter 360, thereby, increasing the voltage across one of the capacitors and increasing the output frequency of the VCO 362, and thus, the modulation signal 222 frequency.

The modulation signal generator 202, in an embodiment, also includes a controller 368 that determines and sets the frequency scaling coefficients applied by the FFS 350. The controller 368 can be implemented as a processor (e.g., a microcontroller, a general-purpose processor, etc.) that executes instructions retrieved from a storage device, or as dedicated hardware circuitry. In some embodiments, the controller 368 is implemented in or is a part of controller 112. The controller 368 can compute the coefficients for frequency synthesis based on each selected output frequency, can retrieve pre-computed coefficients from a table, etc. In other words, the fractional component provided by the combination of the delta sigma modulator 366 and the integer loop divider 364 to the PFD 356 is controllable by the controller 368. Hence, the fractional component can vary as a function of time. This variation in the fractional component leads to variation in the frequency of the modulation signal 222 as a function of time. Additionally, because the fractional component can be increased and/or decreased by any values (e.g., integers and fractions), the frequency variation of the modulation signal 222, based on changing this fractional value, can be as discrete frequency steps and as a continuous variation as a function of time.

Figure 4A:
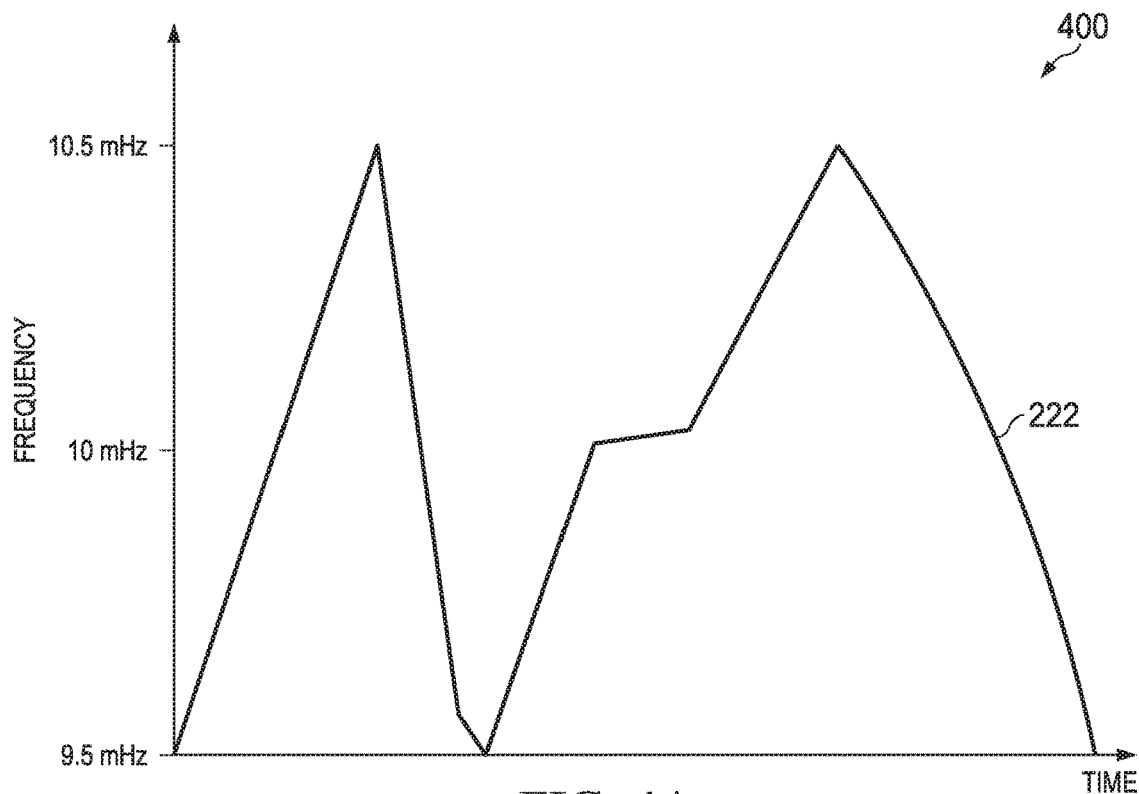
FIG. 4A shows an illustrative frequency versus time graph for a modulation signal having a continuously varying frequency based on a regular shape in accordance with various examples.

FIG. 4A shows an illustrative frequency versus time graph 400 for modulation signal 222 having a continuously varying frequency based on a regular shape in accordance with various examples. As discussed above, the transmitter 102, and more particularly the modulation signal generator 202, is configured, in an embodiment, to continuously vary the modulation signal 222 frequency as a function of time based on a regular shape. Thus, as shown in graph 400, the frequency of the modulation signal 222 is continuously changing (e.g., the frequency increases for one period of time, decreases for another period of time, but is always changing). The shape of the modulation signal 222 frequency as a function of time can take any regular shape (e.g., sine, triangle, sawtooth, etc.). In the example shown in graph 400, a triangular and a sawtooth shape (e.g., a frequency modulated continuous wave (FMCW)) are shown for the modulation signal 222 frequency shape.

Additionally, as shown by the example modulation signal 222 in graph 400, the bandwidth of the modulation signal 222 is 1 MHz as the frequency varies between 9.5 MHz and 10.5 MHz. The mean frequency of the modulation signal 222 is 10 MHz. Therefore, as discussed above, the modulation signal bandwidth is less than, in this case a small fraction of, the mean of the modulation signal 222 frequency.

Figure 4B:
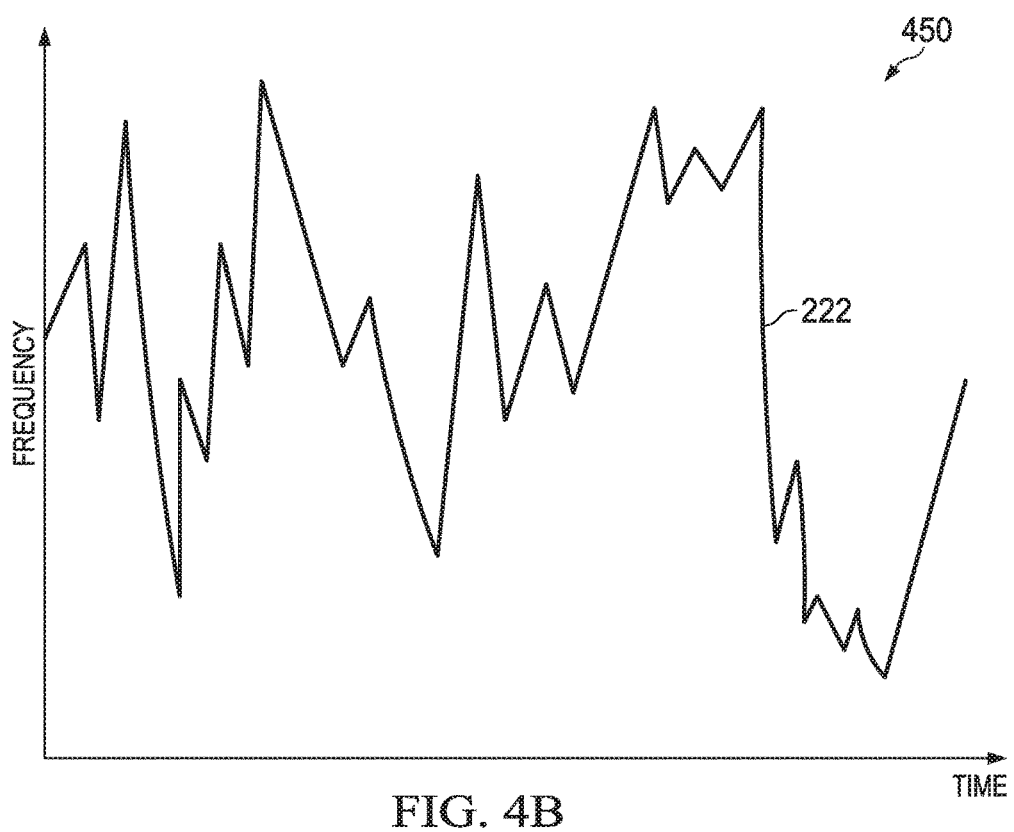
FIG. 4B shows an illustrative frequency versus time graph for a modulation signal having a continuously varying frequency based on a pseudorandom waveform in accordance with various examples.

FIG. 4B shows an illustrative frequency versus time graph 450 for modulation signal 222 having a continuously varying frequency based on a pseudorandom waveform in accordance with various examples. As discussed above, the transmitter 102, and more particularly the modulation signal generator 202, is configured, in an embodiment, to continuously vary the modulation signal 222 frequency as a function of time based on a pseudorandom waveform. Thus, as shown in graph 450, the frequency of the modulation signal 222 is continuously changing (e.g., the frequency increases for one period of time, decreases for another period of time, but is always changing). The shape of the modulation signal 222 frequency as a function of time is pseudorandom. In other words, the frequency variation of the modulation signal 222 satisfies the statistical test for randomness, but is produced by any pseudorandom algorithm by controller 112. In the example shown in graph 450, the variation of the frequency of modulation signal 222 as a function of time is pseudorandom.

Figure 5A:
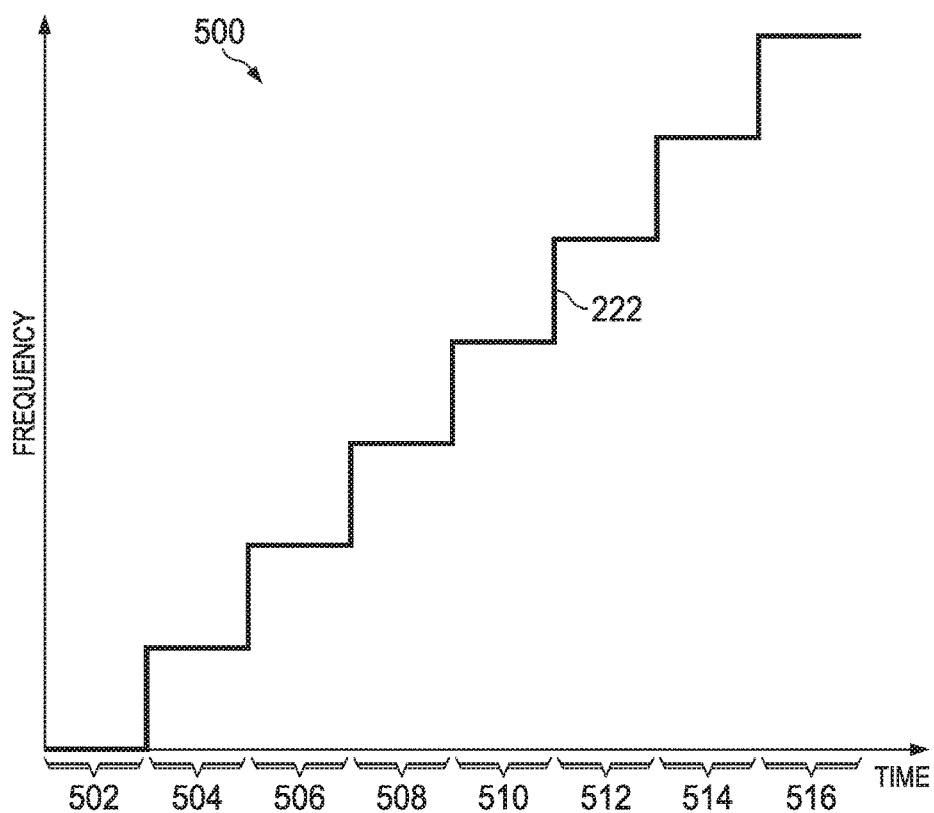
FIG. 5A shows an illustrative frequency versus time graph for a modulation signal having discrete frequency steps that form a regular pattern in accordance with various examples.

FIG. 5A shows an illustrative frequency versus time graph 500 for a modulation signal 222 having discrete frequency steps that form a regular pattern in accordance with various examples. As discussed above, the transmitter 102, and more particularly the modulation signal generator 202 is configured, in an embodiment, to vary the modulation signal frequency as a function of time in a plurality of discrete frequency steps. In other words, the modulation signal generator 202 generates a modulation signal with a plurality of fixed duration segments. A constant modulation signal frequency is maintained during each of the fixed duration segments. After each fixed duration segment ends, the modulation signal is varied. For example, the modulation signal 222 in FIG. 5A includes segments 502-516. The modulation signal generator 202, in this example, configured to generate a modulation signal 222 that has constant frequency during the entirety of segment 502. Once segment 502 ends, the frequency of the modulation signal 222 changes (varies) to another frequency for segment 504 where the frequency is once again constant until segment 504 ends. In this way, the modulation signal 222 frequency as a function of time varies in a plurality of discrete frequency steps. While the segments shown in FIG. 5A are contiguous, in alternative embodiments, the segments can be spaced apart such that there is quiet time (e.g., the modulation signal generator 202 ceases the generation of the modulation signal for a period of time until the next segment begins). Additionally, in some embodiments, the plurality of discrete frequency steps form a regular pattern. In the example shown in FIG. 5A, the plurality of discrete frequency steps form a regular stair step pattern (e.g., a monotonic increasing continuous waveform (discrete FMCW)). In other embodiments, any other regular pattern can be used (e.g., a monotonic decreasing continuous waveform).

Figure 5B:
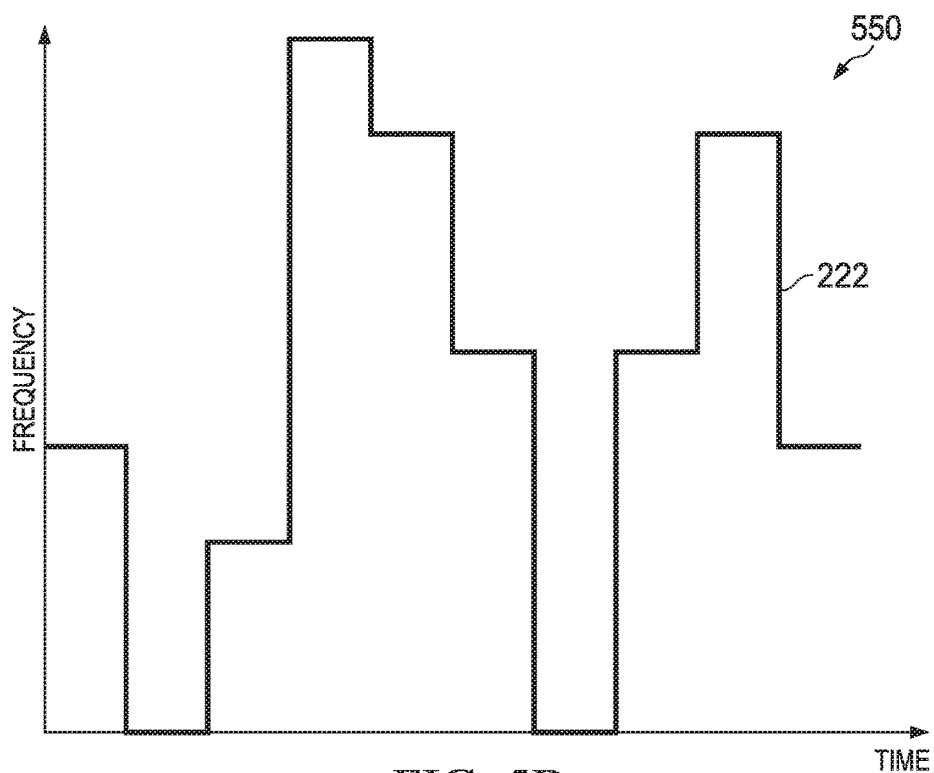
FIG. 5B shows an illustrative frequency versus time graph for a modulation signal having discrete frequency steps that form a pseudorandom pattern in accordance with various examples.

FIG. 5B shows an illustrative frequency versus time graph 550 for a modulation signal 222 having discrete frequency steps that form a pseudorandom pattern in accordance with various examples. As discussed above, the transmitter 102, and more particularly the modulation signal generator 202 is configured, in an embodiment, to vary the modulation signal frequency as a function of time in a plurality of discrete frequency steps. In other words, the modulation signal generator 202 generates a modulation signal with a plurality of fixed duration segments. A constant modulation signal frequency is maintained during each of the fixed duration segments. After each fixed duration segment ends, the modulation signal is varied. In some embodiments, the plurality of discrete frequency steps form a pseudorandom pattern. For example, a number generator (such as a pseudorandom binary sequence (PRBS) can pseudo randomly select from a set of possible modulation frequencies.

Figure 6A:
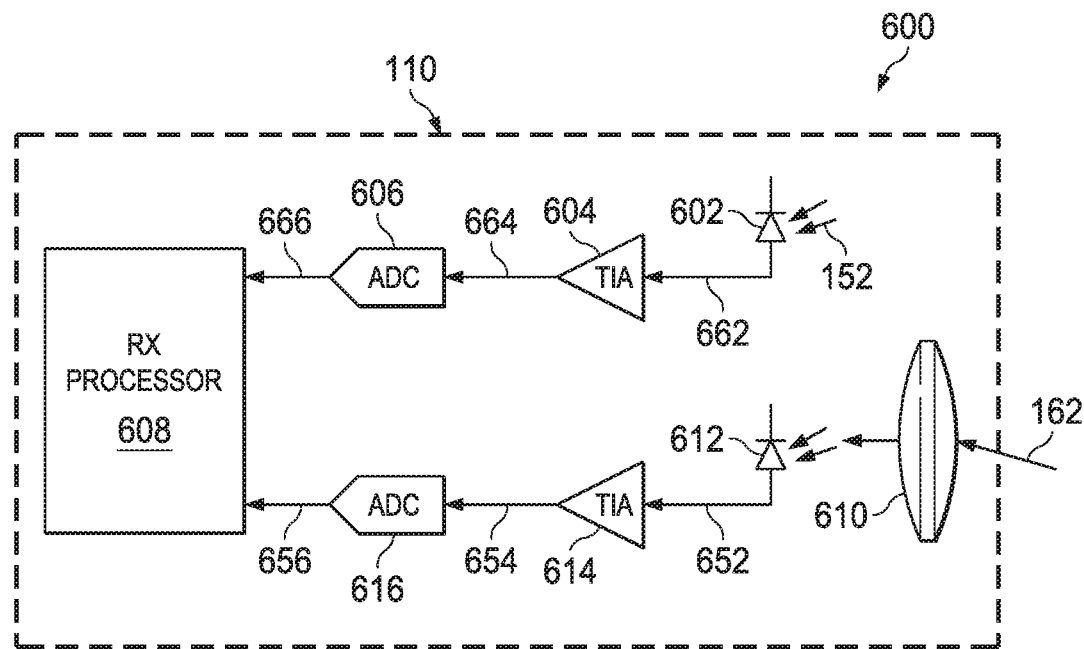
FIG. 6A shows an illustrative receiver for an optical time of flight system in accordance with various examples.

FIG. 6A shows an illustrative optical receiver 110 for optical TOF system 600 in accordance with various examples. The receiver 110 includes, in an embodiment, an optics device 610 (e.g., a lens), two photodiodes 602 and 612, two trans-impedance amplifiers (TIAs) 604 and 614, two analog-to-digital converters (ADCs) 606 and 616, and a receiver processor 608. As discussed above, in an embodiment, the reflected optical waveform 162 is received by the receiver 110 after reflecting off of an object within the FOV 106. The optics device 610, in an embodiment, receives the reflected optical waveform 162. The optics device 610 directs (e.g., focuses) the reflected optical waveform 162 to the photodiode 612. The photodiode 612 is configured to receive the reflected optical waveform 162 and convert the reflected optical waveform 162 into a current received signal 652 (a current that is proportional to the intensity of the received reflected light). TIA 614 is configured to receive the current received signal 652 and convert the current received signal 652 into a voltage signal, designated as voltage received signal 654 that corresponds with the current received signal 652. ADC 616 is configured to receive the voltage received signal 654 and convert the voltage received signal 654 from an analog signal into a corresponding digital signal, designated as digital received signal 656. Additionally, in some embodiments, the current received signal 652 is filtered (e.g., band pass filtered) prior to being received by the TIA 614 and/or the voltage received signal 654 is filtered prior to being received by the ADC 616. In some embodiments, the voltage received signal 654 is received by a time to digital converter (TDC) (not shown) to provide a digital representation of the time that the voltage received signal 654 is received.

Photodiode 602, in an embodiment, receives the optical waveform 152, or a portion of the optical waveform 152, directly from the transmitter 102 and converts the optical waveform 152 into a current reference signal 662 (a current that is proportional to the intensity of the received light directly from transmitter 102). TIA 604 is configured to receive the current reference signal 662 and convert the current reference signal 662 into a voltage signal, designated as voltage reference signal 664 that corresponds with the current reference signal 662. ADC 606 is configured to receive the voltage reference signal 664 and convert the voltage reference signal 664 from an analog signal into a corresponding digital signal, designated as digital reference signal 666. Additionally, in some embodiments, the current reference signal 662 is filtered (e.g., band pass filtered) prior to being received by the TIA 604 and/or the voltage reference signal 664 is filtered prior to being received by the ADC 606. In some embodiments, the voltage reference signal 664 is received by a TDC (not shown) to provide a digital representation of the time that the voltage reference signal 664 is received.

The processor 608 is any type of processor, controller, microcontroller, and/or microprocessor with an architecture optimized for processing the digital received signal 656 and/or the digital reference signal 666. For example, the processor 608 can be a digital signal processor (DSP), a central processing unit (CPU), a reduced instruction set computing (RISC) core such as an advanced RISC machine (ARM) core, a mixed signal processor (MSP), field programmable gate array (FPGA), etc. In some embodiments, the processor 608 is a part of the controller 112. The processor 608, in an embodiment, acts to demodulate the digital received signal 656 and the digital reference signal 666 based on the modulation signal 222. The processor 608 then determines, in an embodiment, the distance to the object 106 by, as discussed above, performing a correlation function using the reference signal and the received signal. A peak in the correlation function corresponds to the time delay of each received reflected optical waveform 162 (i.e., the TOF). The distance to the object 106 can be estimated using the formula discussed above. In other embodiments, an FFT is performed on the received digital signal 656. A phase of the tone is then used to estimate the delay (i.e., TOF) in the received signals. The distance can then be estimated using the formula discussed above.

Figure 6B:
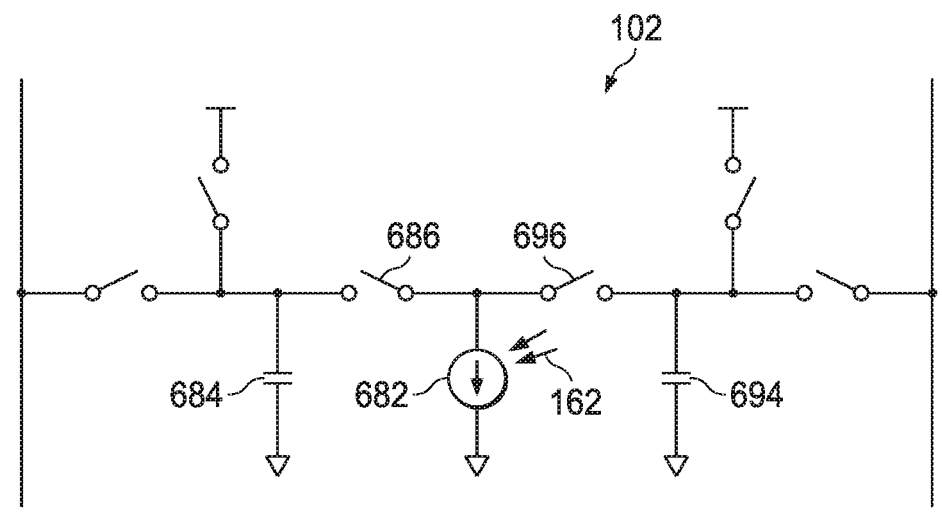
FIG. 6B shows an illustrative receiver for an optical time of flight system in accordance with various examples.

FIG. 6B shows another illustrative receiver 102 for optical TOF system in accordance with various examples. The example receiver 102 shown in FIG. 6B is an I/Q receiver. The receiver 102 includes a photodiode 682, two switches 686 and 696, and two capacitors 684 and 694. The photodiode 682 receives the reflected optical waveform 162 from an object and converts the reflected optical waveform 162 into a current which is proportional to the amount of light being received by the photodiode 682. Because the amplitude of the reflected optical waveform 162 is being modulated, this current is representative of the amplitude modulation of the reflected optical waveform 162 and thus, the transmitted optical waveform 152. By closing switch 686, this current is integrated on capacitor 684. The capacitor 684 integrates the current and collects charge. The switch 686, in an embodiment, is opened and closed using a modulation signal. This operation correlates the transmitted optical waveform 152 with the received reflected optical waveform 162. Thus, the charge on the capacitor 684 is effectively the correlation of the received reflected optical waveform 162 with the modulation signal. The switch 696 is closed using an orthogonal (90 degree phase shifted) version of the modulation signal (the quadrature phase). Thus, the capacitor 694 integrates the current and collects charge based on this quadrature phase of the modulation signal. This operation correlates the quadrature phase of the transmitted optical waveform 152 with the received reflected optical waveform 162. The charge on capacitors 684 and 694 represent the result of the correlation of the received reflected optical signal 162 with respect to the transmitted optical signal 152. These charges can be used to compute the relative phase between the I/Q signals, which can then be used to calculate the distance to the object within FOV 106 as discussed above.

In other words, the I/Q receiver 110 shown in FIG. 6B converts the received reflected optical waveform 162 into an electrical received signal (e.g., a current). This electrical received signal is correlated with the modulation signal 222 (corresponding to the transmitted optical signal 152) to generate an I component. The electrical received signal is also correlated with a 90 degree phase shifted version of the modulation signal 222 to generate a Q component. The phase shift between the electrical received signal and the modulation signal 222 is estimated based on the I component and the Q component. This phase shift is converted into the distance to the object as discussed above.

Figure 7:
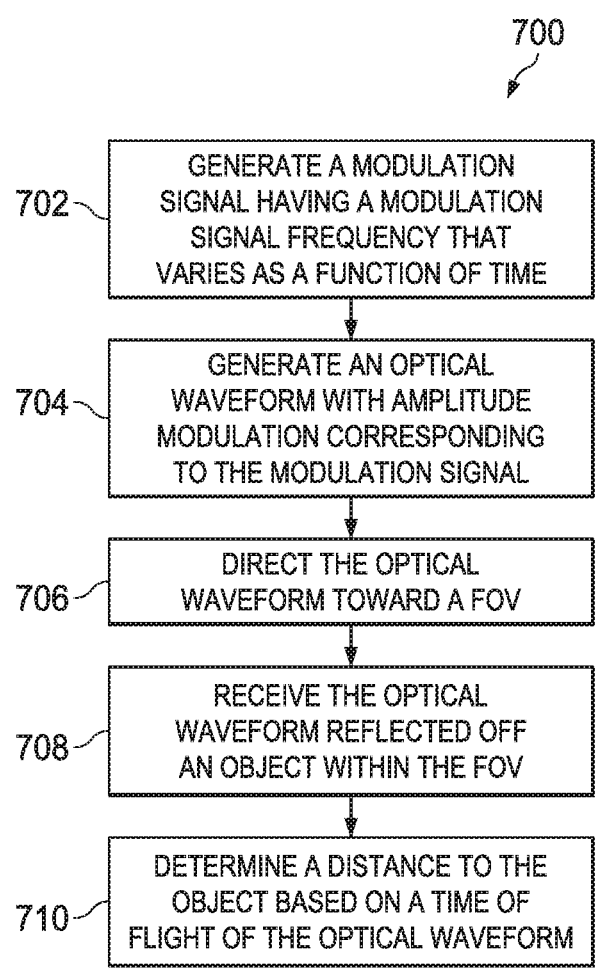
FIG. 7 shows an illustrative flow diagram of a method for determining a distance to an object in accordance with various examples.

FIG. 7 shows an illustrative flow diagram of a method 700 for determining a distance to an object in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 700, as well as other operations described herein, are performed by the transmitter 102 (including the modulation signal generator 202, transmission driver 206, laser diode 208 and/or the optics device 210), the receiver 110 (including the optics device 610, photodiodes 602, 612, and/or 682 TIAs 604 and/or 614, ADCs 606 and/or 616, processor 608, switches 686 and/or 696, and/or capacitors 684 and/or 694), and/or the controller 112 and implemented in logic and/or by a processor executing instructions stored in a non-transitory computer readable storage medium.

The method 700 begins in block 702 with generating a modulation signal having a modulation signal frequency that varies as a function of time. For example, the modulation signal generator 202 is configured, in an embodiment, to generate modulation signal 222 with a constantly varying frequency as a function of time and/or a frequency that varies as a function of time in a plurality of discrete frequency steps.

The method 700 continues in block 704 with generating an optical waveform with amplitude modulation corresponding to the modulation signal. For example, transmit driver 206 generates, in an embodiment, a drive signal (regulates the current) to drive the laser diode 208 so that the laser diode transmits the optical waveform 152 corresponding to the modulation signal 222. Thus, the optical waveform 152 is amplitude modulated based on the frequency of the modulation signal 222. In block 706, the method 700 continues with directing the optical waveform toward the FOV 106. For example, an optics device 210 directs, in an embodiment, the optical waveform 152 toward the FOV 106.

The method 700 continues in block 708 with receiving the optical waveform reflected off an object within the FOV. For example, the optical waveform 152 reflects, in an embodiment, off of an object within the FOV 106 and is received by receiver 110 as reflected optical waveform 162. In block 710, the method 700 continues with determining a distance to the object based on a time of flight of the optical waveform. For example, in one embodiment, the receiver 110 converts the reflected optical waveform 162 into a received electrical signal, such as received digital signal 656, and determines the TOF of this reflected optical waveform 162 based on a comparison between a reference signal corresponding to the optical waveform 152 received directly from the transmitter 102 with the received electrical signal. The distance is then determined based on the TOF. In another embodiment, the receiver 102 is an I/Q receiver which correlates the I component and a Q component of the modulation signal 222 with an electrical signal corresponding to the received reflected optical waveform 162. The phase shift between the I and Q signals is estimated. The phase shift is then converted into the distance to the object within the FOV 106.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. An optical time of flight system, comprising:
   a transmitter having:
      a modulation signal generator having a modulation signal output that varies as a function of time, the modulation signal generator including:

an input frequency divider circuit having a divider input configured to receive a varying frequency input signal, and having a divider output;

a phase and frequency divider (PFD) having first and second PFD inputs and a PFD output, the first PFD input coupled to the divider circuit output;

a charge pump having a charge pump input and a charge pump output, the charge pump input coupled to the PFD output;

a filter having a filter input and a filter output, the filter input coupled to the charge pump output;

a voltage-controlled oscillator (VCO) having a VCO input and a VCO output, the VCO input coupled to the filter output, the VCO output coupled to the modulation signal output and providing a modulation signal;

a feedback frequency divider having first and second feedback inputs and a feedback output, the first feedback input coupled to the VCO output, and the feedback output coupled to the second PFD input; and a delta-sigma modulator having a sigma input and a first and second sigma outputs, the sigma input configured to receive a controller input, the first sigma output coupled to the first feedback input, and the second sigma output coupled to the second PFD input;

a driver having a driver input and a driver output, the driver input coupled to the modulation signal output; and a receiver configured to receive an optical waveform reflected off of an object, and determine a distance to the object based on a time of flight from the transmitter to the object and back to the receiver.

2. The optical time of flight system of claim 1, wherein the transmitter is configured to generate the modulation signal, the modulation signal having modulation signal bandwidth that is less than a mean of the modulation signal frequency.

3. The optical time of flight system of claim 1, wherein the transmitter is configured to continuously vary the modulation signal frequency as a function of time, the modulation signal having a regular shape.

4. The optical time of flight system of claim 1, wherein the transmitter is configured to continuously vary the modulation signal frequency as a function of time, the modulation signal having a pseudorandom waveform.

5. The optical time of flight system of claim 1, wherein the transmitter is configured to vary the modulation signal frequency as a function of time in discrete frequency steps.

6. The optical time of flight system of claim 5, wherein the discrete frequency steps form a regular pattern.

7. The optical time of flight system of claim 5, wherein the discrete frequency steps form a pseudorandom pattern.

8. The optical time of flight system of claim 1, wherein:
the modulation signal includes fixed duration segments; and
the transmitter is configured to maintain a constant modulation signal frequency during each of the fixed duration segments and vary the modulation signal frequency after each fixed duration segment ends.

9. The optical time of flight system of claim 8, wherein each of the fixed duration segments is contiguous with another of the fixed duration segments.

10. The optical time of flight system of claim 8, wherein after each fixed duration segment ends, the transmitter is configured to cease providing the modulation signal for a period of time until a next fixed duration segment begins.

11. The optical time of flight system of claim 1, wherein the receiver is configured to:
convert the received optical waveform reflected off of the object into an electrical received signal;
correlate the electrical received signal with the modulation signal to generate an in-phase (I) component;
correlate the electrical received signal with a 90 degree phase shifted version of the modulation signal to generate a quadrature (Q) component;
estimate the phase shift between the electrical received signal and the modulation signal responsive to the I component and the Q component; and
convert the phase shift into the distance to the object.

12. An optical transmitting system for distance measuring, comprising:
a modulation signal generator having a modulation signal output, the modulation signal generator including a phase-locked loop (PLL) configured to receive a varying frequency input signal and provide, at the modulation signal output, a modulation signal having a frequency that varies as a function of time, the PLL including:
an input frequency divider circuit having a divider input configured to receive a varying frequency input signal, and having a divider output;
a phase and frequency divider (PFD) having first and second PFD inputs and a PFD output, the first PFD input coupled to the divider circuit output;
a charge pump having a charge pump input and a charge pump output, the charge pump input coupled to the PFD output;
a filter having a filter input and a filter output, the filter input coupled to the charge pump output;
a voltage-controlled oscillator (VCO) having a VCO input and a VCO output, the VCO input coupled to the filter output, the VCO output coupled to the modulation signal output and providing a modulation signal;
a feedback frequency divider having first and second feedback inputs and a feedback output, the first feedback input coupled to the VCO output, and the feedback output coupled to the second PFD input; and
a delta-sigma modulator having a sigma input and first and second sigma outputs, the sigma input configured to receive a controller input, the first sigma output coupled to the first feedback input, and the second sigma output coupled to the second PFD input.

13. The optical transmitting system of claim 12, wherein the input frequency divider is comprised of a dual-modulus divider.

14. The optical transmitting system of claim 12, wherein the modulation signal generator includes a fractional frequency synthesizer (FFS) configured to receive a constant frequency input signal and output the modulation signal by varying a fractional component in the FFS.

15. The optical transmitting system of claim 14, wherein the fractional component is varied as a function of time.

16. The optical transmitting system of claim 12, wherein the modulation signal generator includes a fractional frequency synthesizer (FFS) configured to receive a constant frequency input signal.

17. A method for determining a distance to an object, comprising:
generating a modulation signal having a modulation signal frequency that varies as a function of time, the modulation signal frequency being a fraction of the mean bandwidth, the modulation signal being generated by a delta-sigma modulator receiving an input signal from a controller;

generating an optical waveform with amplitude modulation corresponding to the modulation signal;

directing the optical waveform toward a field of view (FOV);

receiving the optical waveform reflected off of an object within the FOV; and determining a distance to the object based on a time of flight of the optical waveform.

18. The method of claim 17, wherein the generating the modulation signal includes generating a modulation signal frequency that continuously varies as a function of time.

19. The method of claim 17, wherein the generating the modulation signal includes generating a modulation signal frequency that varies as a function of time in discrete frequency steps.

* * * * *